United States Patent [19]

Yanagi

[11] 4,200,531
[45] Apr. 29, 1980

[54] TUBULAR MEMBRANE SEPARATION APPARATUS

[75] Inventor: Chota Yanagi, Kobe, Japan

[73] Assignee: Kobe Steel, Limited, Kobe, Japan

[21] Appl. No.: 906,422

[22] Filed: May 16, 1978

[30] Foreign Application Priority Data

May 16, 1977 [JP] Japan ............................ 52-56836

[51] Int. Cl.² ............................................ B01D 31/00
[52] U.S. Cl. ................................ 210/137; 210/353; 210/355; 210/433 M
[58] Field of Search ............... 134/8; 210/259, 23 H, 210/353, 355, 321 R, 137, 433 M

[56] References Cited

U.S. PATENT DOCUMENTS

| | | | |
|---|---|---|---|
| 2,801,824 | 8/1957 | Taprogge | 257/1 |
| 3,547,142 | 12/1970 | Webb | 134/8 |
| 4,080,289 | 3/1978 | Ebara et al. | 210/259 X |

*Primary Examiner*—Frank A. Spear, Jr.
*Attorney, Agent, or Firm*—Oblon, Fisher, Spivak, McClelland & Maier

[57] ABSTRACT

The present invention relates to a tubular membrane separation apparatus used for purification of turbid water, concentration of liquid material, sea-water desalting and so on, which is characterized by a feedwater line, a tubular membrane member adapted to concentrate a feedwater, a concentrated-water line which is disposed in such a manner that the direction of flow therein is opposite to the direction of flow in the feedwater line and a cleaning ball delivery member, said cleaning ball delivery member including a stationary member disposed to cross the feedwater line and concentrated-water line and divide each of the two lines into an upstream and downstream segment, the stationary member being provided with passageways extending in parallel with each other and respectively adapted to communicate the upstream segment of the feedwater line with the downstream segment thereof and the upstream segment of concentrated-water line with the downstream segment thereof, a movable member which comprises at least one ball retaining member including a chamber formed in communicable relationship with an upstream and a downstream segment of each of the passageways and a screen disposed adjacent one end of said chamber, the movable member being movably mounted within the stationary member in such a manner that the ball retaining member may be alternately shifted into phase with the two passageways, and seal members adapted and disposed to establish a fluid-tight seal between cooperating surfaces of the stationary member and the movable member.

5 Claims, 18 Drawing Figures

TUBULAR MEMBRANE SEPARATION APPARATUS

BACKGROUND OF THE INVENTION

1. Field of the Invention

This invention relates to a tubular membrane separation apparatus of the self-cleaning type.

2. Description of the Prior Art

Ultrafiltration and reverse osmosis apparatuses are known wherein a feedwater is pressurized and concentrated on the inner side of a tubular membrane to yield a purified water on the outer side of said tubular membrane.

Such apparatuses are each comprised of a single or a plurality of modules, which are units of tubular membrane, and whereas an ultrafiltration apparatus incorporates comparatively coarse membranes for separatory removal of the macromolecules contained in feedwater, a reverse-osmosis apparatus comprises comparatively dense membranes so as to separate small-sized particulate contaminants such as ions.

The reverse-osmosis technique is capable of separating and concentrating non-ionizable contaminants which cannot be separated by electrodyalysis, which involves the use of a similar membrane, and has therefore been commonly utilized for the separation of inorganic substances as well as for the separation and concentration of organic materials.

Compared with other types of reverse-osmosis equipment, the reverse-osmosis apparatus employing tubular membranes, in particular, is advantageous in that it does not require any elaborate pretreatment and withstands rugged conditions of use. However, as it is the case with other reverse-osmosis equipment, the fouling matter accumulates of necessity as the process of concentration proceeds, so that the permeation performance of the membranes is gradually reduced. This problem is shared by ultrafiltration equipment. The fouling matter mentioned above comprises the suspended matter, organic matter and microorganisms contained in the feedwater as well as the insoluble salts, metal hydrozides and so on which are deposited on the internal surface of the membrane with the progress of concentration and, usually cannot be readily removed by flushing or by washing with a chemical solution.

Once the fouling matter begins to accumulate on the inner surface of the membrane, the accumulation and growth of such fouling matter proceeds at an accelerated rate with the initial deposits acting as nuclei. Therefore, to prevent a reduction in permeation performance of the equipment, the internal surface of the membrane must be kept clean at all times while the equipment is operated.

To solve this problem, S. Leob et al proposed in 1966 a mechanical cleaning method which comprises passing cleaning balls made of an elastic material such as sponge rubber through the tubular membrane units to remove the fouling matter. This method has thence been improved and such improvements include the following.

A. A method of cleaning the internal surface of a tubular membrane which comprises sending cleaning balls along with a cleaning solution from the feedwater inlet side while the equipment is resting idle.

B. A method of cleaning the interval surface of a tubular membrane which comprises entrapping cleaning balls between the two screens disposed adjacent the feedwater inlet and the concentrate outlet, respectively, of the membraneous separation apparatus and causing the balls to ply between the screens as the direction of flow of the water is reversed.

C. A method of cleaning the internal surface of a membrane which comprises sending cleaning balls from a ball feeding element disposed adjacent the feedwater inlet of the apparatus to clean the internal surface of the membrane and withdrawing the used balls from a ball-takeout element disposed adjacent the concentrated-water outlet of the apparatus.

The tubular membrane separation apparatuses embodying those methods, however, are invariably inadequate in the case of control and in efficiency. More particularly, the known apparatuses have the following disadvantages.

The first method A is inefficient in that, to effect the necessary cleaning, the operation of the apparatus must be suspended, thus precluding the benefit of a continuous operation.

The second method B not only involves additional first costs, e.g. the costs of additional piping and switch valve means for reversing the flow, but a complexity of switching operation and, hence, problems related to process control. Moreover, because the switching operation is of necessity accompanied by interruptions of flow and pressure fluctuations, the efficiency of water-treatment is sacrified. Furthermore, the reversing of flow is not feasible in the tubular membrane separation apparatus comprising a Christmas-tree arrangement of modules.

The third method C is the most desirable of all in that since the apparatus can be cleaned during its operation, the design efficiency can be fully maintained and the initial cost of the apparatus is comparatively low. Nonetheless, because independent devices must respectively be provided for feeding and withdrawing cleaning balls, the cleaning operation cannot be carried out in a closed circuit, particularly when frequent cleanings at short intervals are required, such that the method has problems related to operation control.

SUMMARY OF THE INVENTION

The object of this invention is to provide a tubular membrane separation apparatus which is free from the above disadvantages of the prior art methods and apparatuses. More particularly, the object of this invention is to provide a tubular membrane separation apparatus having a cleaning ball delivery system which does not require a suspension or reversal of flow, is simple in construction and is capable of effecting positive and repeated cleanings without interferring with the operation of the apparatus in any manner.

Therefore, a first aspect of the present invention relates to a tubular membrane separation apparatus which comprises a feedwater line, a tubular membrane means adapted to concentrate a feedwater, a concentrated-water line which is disposed in such a manner that the direction of flow therein is opposite to the direction of flow in said feedwater line and cleaning ball delivery means, said cleaning ball delivery means including a stationary member disposed to cross said feedwater line and concentrated-water line and divide each of the two lines into an upstream and downstream segment, said stationary member being provided with passageways extending in parallel with each other and repectively adapted to communicate said upstream segment of the feedwater line with said downstream segment thereof and said upstream segment of concentrated-water line with said downstream segment thereof, a movable member which comprises at least one ball retaining member including a chamber formed in communicable relationship with an upstream and a downstream segment of each of said passageways and a screen disposed adjacent one end of said chamber, said movable member being movably mounted within said stationary member in such a manner that said ball retaining member may be alternately shifted into phase with said two passageways, and seal means adapted and disposed to establish a fluid-tight seal between cooperating surfaces of said stationary member and said movable member.

A second aspect of the present invention relates to a tubular membrane separation apparatus substantially according to said first aspect wherein said stationary member of said cleaning ball delivery means is further provided, in parallel with said feedwater line and concentrated-water line, with a third passageway having the same direction of flow as the concentrated water line and communicating an upstream segmemt of a cleaning ball feed line with a downstream segment thereof and/or a fourth passageway having the same direction of flow as the feedwater line and communicating an upstream segment of a cleaning ball takeout line with a downstream segment thereof, said movable member being movably mounted within said stationary member in such a manner that said ball retaining member may be shifted in an indexing movement from a position in phase with one of said passageways to a position in phase with the other passageway.

A third aspect of the present invention relates to a tubular membrane separation apparatus substantially according to said first aspect wherein said parallel passageways in said stationary member of said cleaning ball delivery means are disposed in a common plane and said movable member is slidably mounted within said stationary member in such a manner that said ball retaining member may be shifted in an indexing movement in said common plane.

A fourth aspect of the invention relates to a tubular membrane separation apparatus substantially according to said first aspect wherein said movable member is rotatably mounted on said stationary member of said cleaning ball delivery means and said passageways in said stationary member and said ball retaining member in said movable member are disposed in concentric relation about the axis of rotation of said movable member.

A fifth aspect of the present invention relates to a tubular membrane separation apparatus substantially according to said first aspect wherein each of said passageways within said stationary member of said cleaning ball delivery means is provided with a bypass-line.

BRIEF DESCRIPTION OF THE DRAWINGS

Various other objects, features and attendant advantages of the present invention will be more fully appreciated as the same becomes better understood from the following detailed description when considered in connection with the accompanying drawigs in which like reference characters designate like or corresponding parts throughout the several view, and wherein.

DETAILED DESCRIPTION OF THE PREFERRED EMBODIMENT

Figure 1:
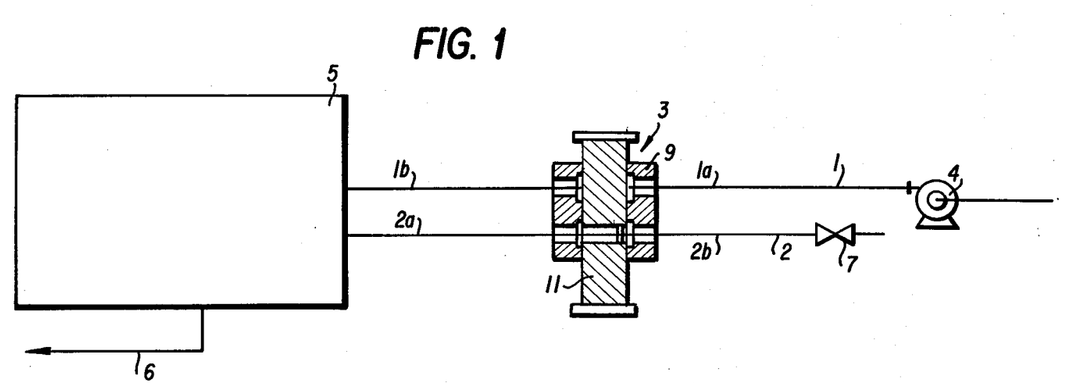
FIG. 1 is a diagrammatic view showing the manner in which cleaning balls are sent through the apparatus by the cleaning ball delivery means of the present invention.

Referring to FIG. 1, a feedwater line, a concentrated-water line and a cleaning ball delivery means disposed to cross said lines in a position partway of their lengths are indicated by reference numerals (1), (2) and (3), respectively. A feedwater which is pressurized and fed by a feed pump (4) into an upstream segment (1a) of the feedwater line (1) flows through the ball delivery means (3) and a downstream segment (1b) of the feedwater line (1) to a tubular membrane separation means (5) in which the water is filtered across the tubular membrane. The filtrate external of the membrane is withdrawn from a filtrate line (6). The concentrated water on the inner side of the tubular membrane flows into an upstream segment (2a) of concentrated-water line (2) and, thence, into the ball delivery means (3) and a downstream segment (2b) of concentrated-water line (2) and is finally withdrawn through a pressure control valve (7).

Figure 2:
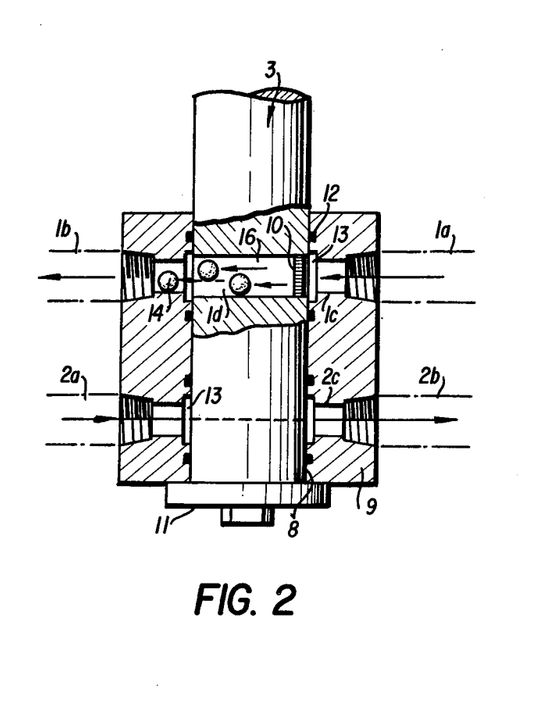
FIG. 2 and FIG. 3 are sectional views showing the ball delivery means in detail and in action.
Figure 3:
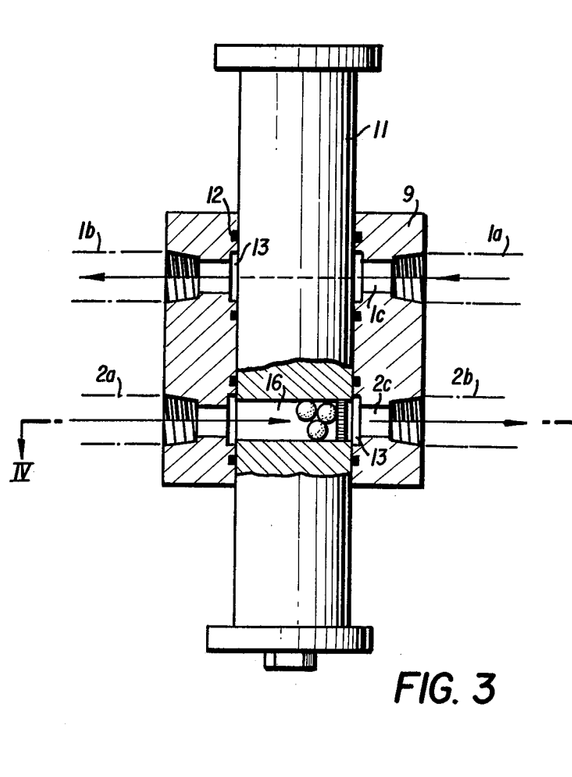

The structure of the ball delivery means (3) is shown in FIGS. 2 and 3. The ball delivery means (3) comprises a stationary member (9) which is provided with passageways (1c) and (2c) communicating the upstream and downstream segments of feedwater line (1a), (1b) and those of concentrated-water line (2a), (2b), respectively, and a through-hole (8) extending in a direction perpendicular to said passageways (1c) and (2c) and a movable member (11) having a ball retaining member (16) which is a chamber (1d) provided with a screen (10) adjacent one end thereof, said movable member (11) being slidably mounted within said through-hole (8) in said stationary member (9).

Figure 4:
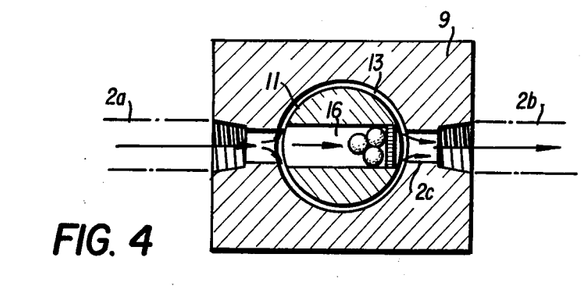
FIG. 4 is a sectional view taken along the line IV—IV of FIG. 3.

Each of the passageways (1c) and (2c) is sealed by O-rings (12) where said stationary member (9) is in sliding contract with said movable member (11). As illustrated in the sectional elevation view of FIG. 4, each of passageways (1c) and (2c) is provided with a bypass (13) so that the flow of the fluid through the corresponding passageway (1c) or (2c) is not arrested even when the ball-retaining member (16) is full of balls (14) or when the chamber (1d) of the movable member (11) is out of alignment with the passageway (1c) (2c) as the movable member (11) is shifted.

The movable member (11) is normally in the position shown in FIG. 3 where the upstream and downstream segments (1a, 1b) of feedwater line are in mutually communicating relationship via the passageway (1c) and bypass (13) within the stationary member and the corresponding two segments of concentrated-water line (2a) (2b) are in communicating relationship via the ball retaining member (16) lying in alignment with the passageway (2c) of the stationary member (9).

In the cleaning mode, as shown in FIG. 2, the movable member (11) is shifted until the ball-retaining member (16) has come into alignment with the passageway (1c), whereupon the cleaning balls (14) retained in the ball-retaining member (16) are ejected by the pressure of the feedwater into the downstream segment (1b) of feedwater line (1) and, thence, into the tubular member means (5). Thereafter, as the movable member (11) is shifted back to the position indicated in FIG. 3, the balls (14) which have finished cleaning the inner surface of the tubular member and been withdrawn into the upstream segment (2a) of concentrated-water line (2) are received by the ball-retaining member (16). The movable member (11) carrying the balls (14) is thus held in this stand-by position until the next cleaning mode is started. Thus, as the fouling of the inner surface of the tubular membrane progresses with time due to a continued operation of the apparatus and the separation performance of the membrane is accordingly reduced, the movable member (11) is shifted up again to the position indicated in FIG. 2 to return the cleaning balls (14) to the feedwater line for another cleaning mode.

The separation performance of the tubular membrane is maintained at high levels as the progress of fouling of the inner surface of the membrane is arrested by sending the cleaning balls (14) through the tubular membrane repeatedly and at necessary intervals during the continued operation of the tubular membrane separation apparatus.

The shifting of the movable member which has been described above may be effected either manually or from a remote operating position, i.e. by means of an air cylinder. It is also possible to associate the ball delivery means or the entire separation apparatus with a timer, pressure gauge and other controls for a fully automatic operation.

By the time a certain number of cleaning modes are completed, the cleaning balls will have been fouled or damaged to the extent that they must be replaced with new balls. For this purpose, the stroke of the movable member (11) may be increased so that the ball-retaining member (16) will be withdrawn clear of the stationary member (9), thus permitting the fouled balls to be taken out and new balls to be supplied.

Figure 5:
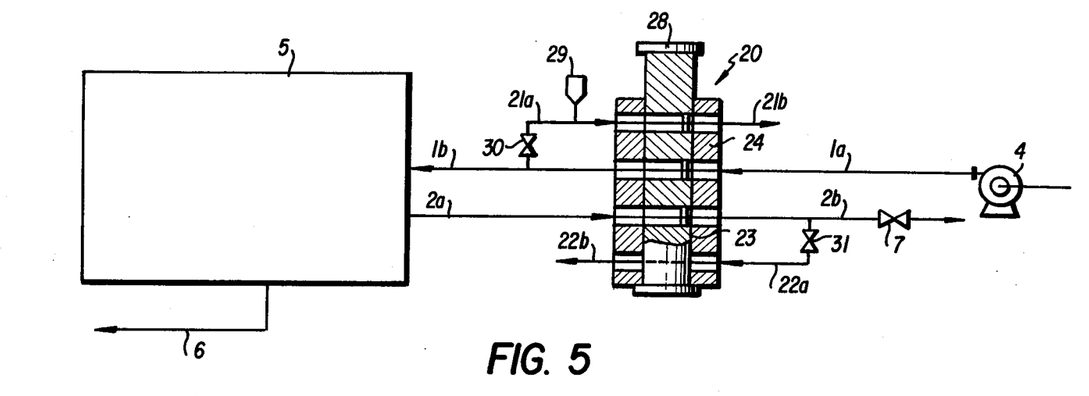
FIG. 5 is a diagrammatic view showing the manner in which cleaning balls are sent through the apparatus by another cleaning ball delivery means.

FIG. 5 is a diagrammatic view showing a ball circulating system having a ball delivery means (20) which includes a ball feeding and a ball takeout means.

Referring now to FIGS. 7 through 12, the operation of the ball delivery means (20) will be explained. The ball delivery means (20) comprises a stationary member (24) having four passageways (21c), (1c), (2c) and (22c) communicating with a ball feed line (21a) which is a branch line of the downstream segment (1b) of feedwater line (1), the feedwater line (1), the concentrated-water line (2) and a ball takeout line (22a) which is a branch line of the downstream segment (2b) of said concentrated-water line (2), respectively, as well as a through-hole (23) extending in a direction perpendicular to these passageways, and a movable member (28) which has three ball-retaining members (25), (26) and (27) and is shiftably mounted within said through-hole (23) in said stationary member (24). The movable member (28) is normally in the position shown in FIG. 7, with said ball-retaining members (25), (26) and (27) being located in alignment with said passageways (1c), (2c) and (22c).

Figure 6:
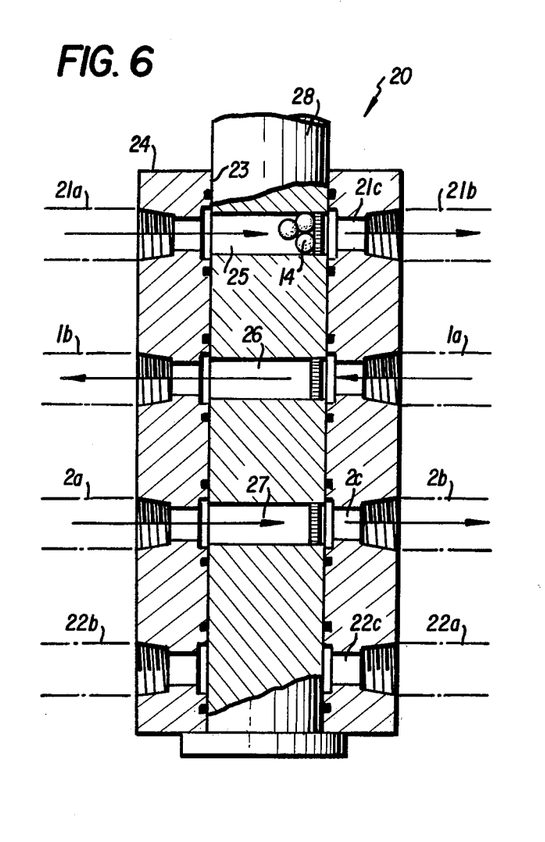
FIGS. 6 and 7 are sectional views showing the cleaning ball delivery means in detail and in ball-receiving action.
Figure 7:
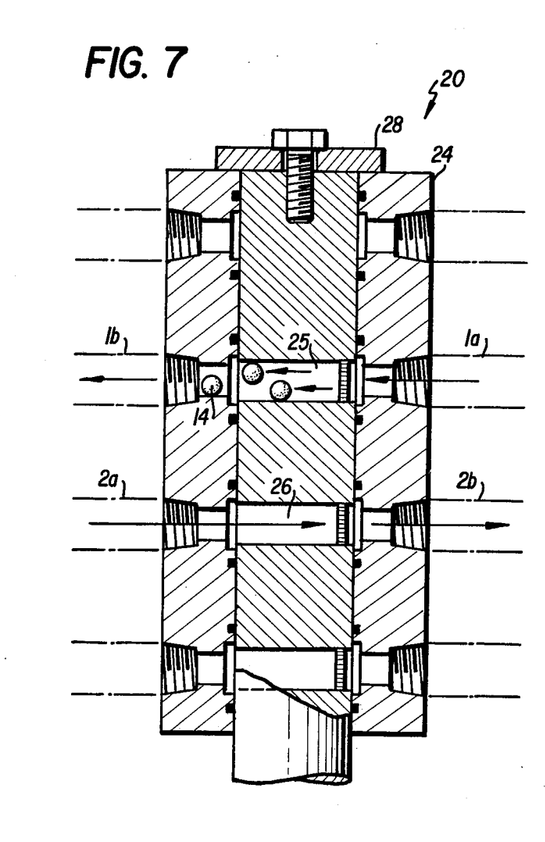
Figure 8:
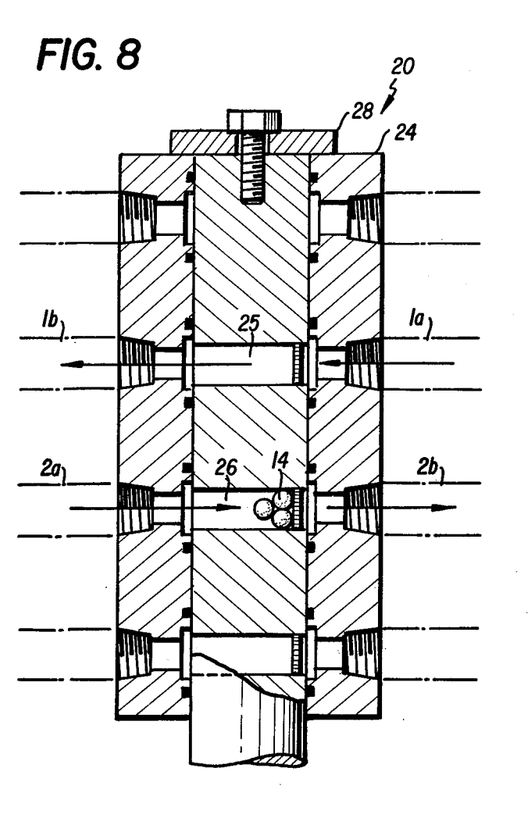
FIGS. 8 and 9 are views showing the manner in which cleaning balls are sent through the apparatus by the same delivery means.
Figure 9:
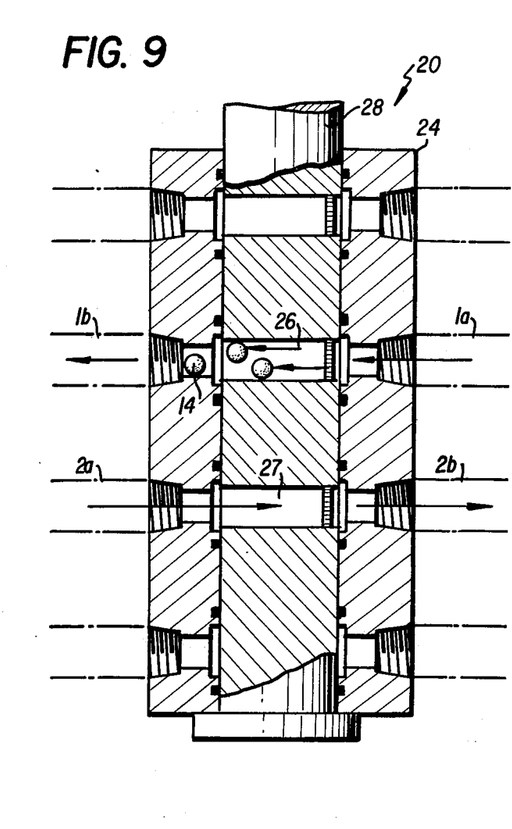

First, cleaning balls (14) are charged into a ball charging member (29) and a valve (30) is opened to let the feedwater flow into the ball feed line (21a) (FIG. 5). With the movable member (28) shifted up into the position indicated in FIG. 6, the balls (14) entering from the ball feed line (21a) are received by the ball-retaining member (25). The movable member (28) is then shifted down to the position illustrated in FIG. 7, whereupon the flow of the feedwater ejects the balls (14) into the downstream segment (1b) of the feedwater line (1). Upon completion of the feeding of balls (14) into the feedwater line (1b), the valve (30) is closed to cut off the flow of water to the ball feed line (21a). The movable member (28) is maintained in the position indicated in FIG. 7 and the balls which have finished cleaning the inner surface of the tubular membrane of the separation apparatus (5) are received by the ball-retaining member (26) as illustrated in FIG. 8. The ball delivery means (20) is held in this standby position for the next cleaning mode. For the next cleaning operation, the movable member (28) is shifted up to the position indicated in FIG. 9 as as to feed the balls (14) from the ball-retaining member (26) to the downstream segment (1b) of feedwater line (1). Then, the movable member (28) is shifted down to the position illustrated in FIG. 8. The balls (14) which have finished cleaning the inner surface of the tubular membrane and have been withdrawn into the concentrated-water line (2a) are received in the ball-retaining member (26). By repeating the actions shown in FIGS. 8 and 9 in the same manner as described with reference to the ball delivery means (3) illustrated in FIGS. 2 and 3, the tubular membrane separation apparatus can be continuously operated while maintaining its separation performance at high levels.

Figure 10:
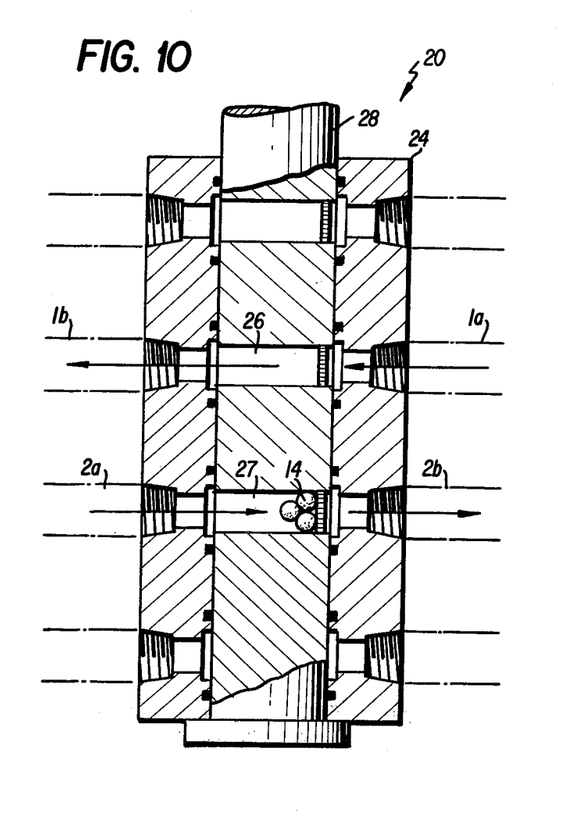
FIGS. 10 and 11 are views showing the manner in which cleaning balls are taken out from the apparatus by the delivery means.
Figure 11:
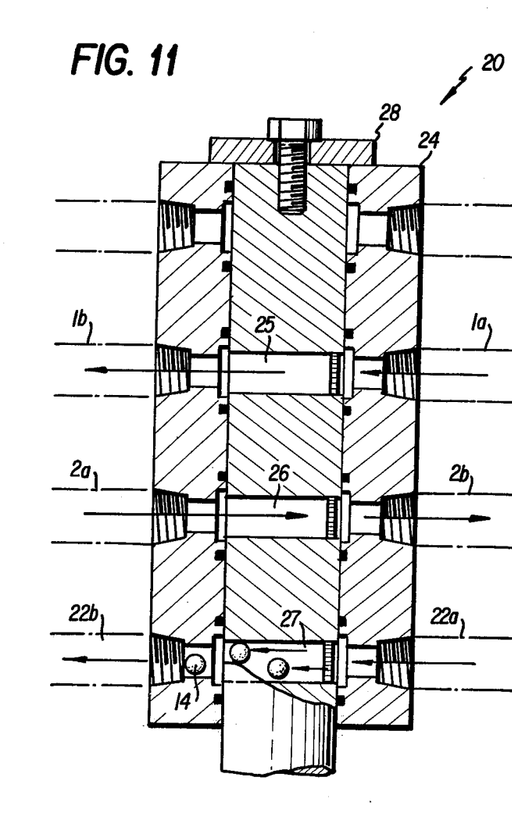

After a certain number of cleaning modes, the cleaning balls (14) are taken out of the system. Thus, if after the supply of balls (14) into the feedwater line (1b) the movable member (28) is kept stationary in the position of FIG. 9, the balls which have finished cleaning the membranes and been withdrawn into the upstream segment (2a) of concentrated-water line (2) are received by ball-retaining member (27) as shown in FIG. 10. Thereafter, the movable member (28) is shifted down to the position indicated in FIG. 11 and a valve (31) is opened to admit the concentrated water into the ball takeout line (22a), whereupon the balls (14) in the ball-retaining member (27) are flushed out from the apparatus through the ball takeout line (22b).

Figure 12:
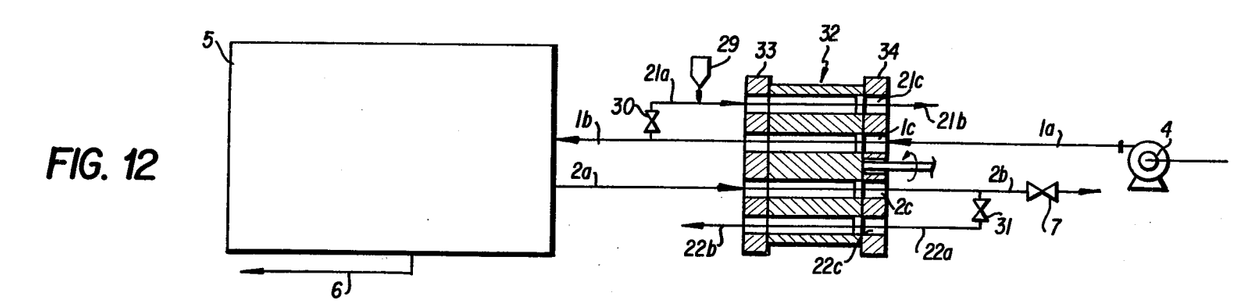
FIG. 12 is a diagrammatic view showing the manner in which cleaning balls are sent through the apparatus by another delivery means (32)

The foregoing embodiments incorporate ball delivery means such that the cleaning balls (14) withdrawn into the concentrated-water line (2a) are returned to the feedwater line (1b) by linear shifting of a movable member including ball-retaining means within a stationary member. FIG. 12 illustrates another embodiment of the present invention wherein still another ball delivery is employed. Thus, while the ball delivery means (32) is substantially similar to the one (20) illustrated in FIG. 5, a movable member 40 including ball-retaining means 38 is rotatably supported within a stationary member 34 to transfer cleaning balls of one line to another.

Figure 13:
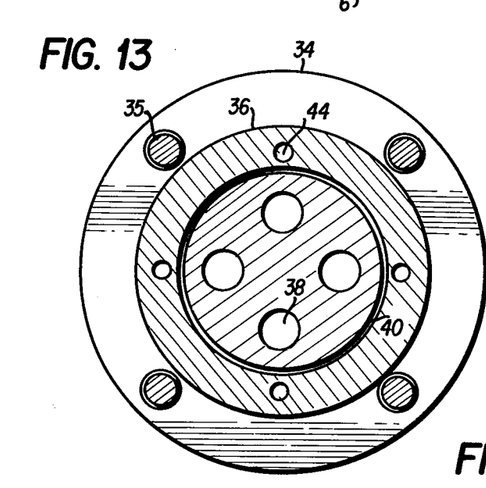
FIG. 13 is a sectional view taken along the line XIII—XIII of FIG. 14.
Figure 14:
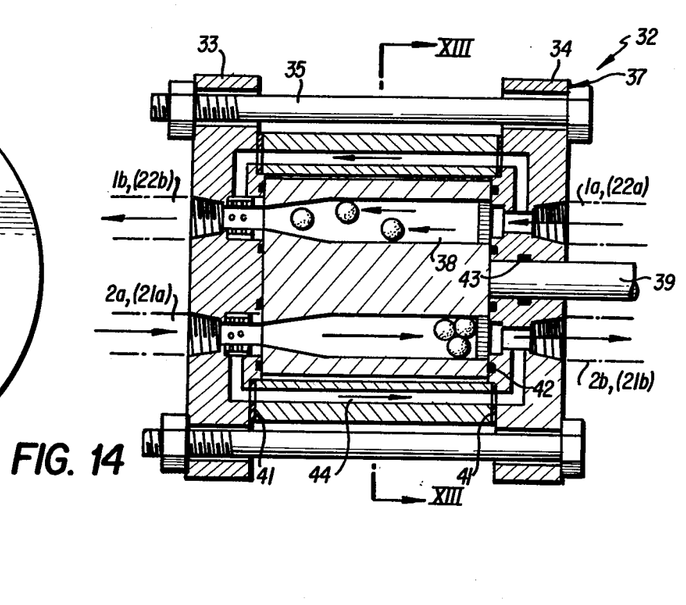
FIG. 14 is a detailed section view showing the cleaning ball delivery means.

As illustrated in FIGS. 13 and 14, the ball delivery means (32) comprises a stationary member (37) having end-plates (33) and (34) and a shell (36) secured by bolts (35) in position between said end-plates (33) and (34) and a movable member (40) rotatably supported within said stationary member (37). The end-plates (33) and (34) are respectively provided with passageways (1c), (2c), (21c) and (22c) disposed at angular spacings of 90 degrees and communicating with lines (1a, 1b), (2a, 2b) and (22a, 22b), respectively. The lines just mentioned correspond to the lines illustrated in FIG. 5. The movable member (40) is provided with four ball-retaining members (38) registerable with said passageways (1c), (2c), (21c) and (22c) and a drive shaft (39) extending through the end plate (34).

A fluid-tight seal is ensured by a gasket 41 between the shell (36) and each of end-plates (33) (34), while a seal is respectively maintained by an O-ring (42, 43) between the movable member (40) and each of end-plates (33), (34) and between the drive shaft (39) and end-plate (34). Bypasses (44) are also formed to ensure a continued flow within each line even when the ball-retaining means (38) is full of balls or when the movable member (40) is in the course of revolution and the ball-retaining members (38) are accordingly out of phase or registry with the lines.

The operation of the ball delivery means (32) will hereinafter be described with reference to FIGS. 15a through FIG. 15d.

FIGS. 15a through FIG. 15d illustrate the sequence by which the positions of the four ball-retaining members (381), (382), (383) and (384) are angularly shifted by 90 degrees to accomplish the feeding of cleaning balls and the cleaning of the tubular membrane separation means. First with the movable member (40) held in the position shown in FIG. 15a, cleaning balls (14a) are supplied from the ball feed line (21a) into a ball-retaining member (381). Then, the movable member (40) is driven through 90 degrees in a clockwise direction to the phase illustrated in FIG. 15b. Now that the ball-retaining member (381) is in phase with the downstream segment (1b) of feedwater line (1), the balls (14a) are ejected into said downstream segment and, thence, sent through the tubular membrane separation means (5). The balls (14a) are withdrawn into the concentrated-water line (2a) and received by ball-retaining member (384). Then, as cleaning balls (14b) are fed from the ball-feed line (21a) to the ball-retaining member (382) and the movable member (40) is rotated through 90 degrees in a clockwise direction to the phase of FIG. 16c, the balls (14b) are sent through the downstream segment (1b) of feedwater line (1), the tubular membrane separation means (5) and the upstream segment (2a) of concentrated-water line (2) to be finally received by ball-retaining member (381). Similarly, as cleaning balls (14c) are fed to the ball-retaining member (383) and, then, the movable member (40) is rotated through 90 degrees in a clockwise direction to the position of FIG. 15d, these balls are now sent through the downstream segment (1b) of feedwater line, the tubular membrane means (5) and the upstream segment (2a) of concentrated water line (2) and finally received by ball-retaining member (382). After the three feedings of cleaing balls have been completed as described above, the next and subsequent cleaning operations can be simply accomplished by rotating the movable member (40) through 90 degrees each time.

Figure 15A:
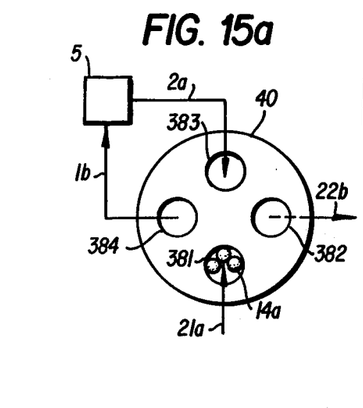
FIGS. 15a through 15d are diagrammatic views showing the manner in which cleaning balls are received by the delivery means.
Figure 15B:
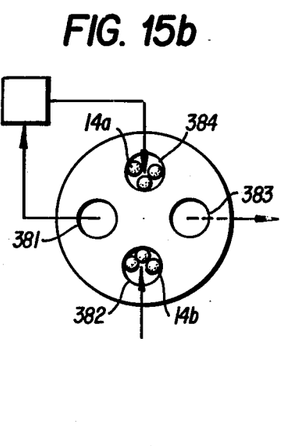
Figure 15C:
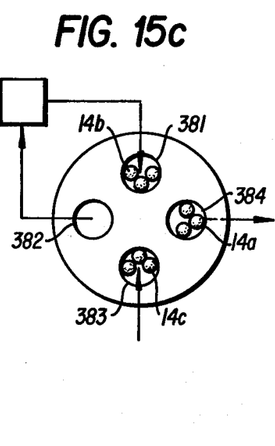
Figure 15D:
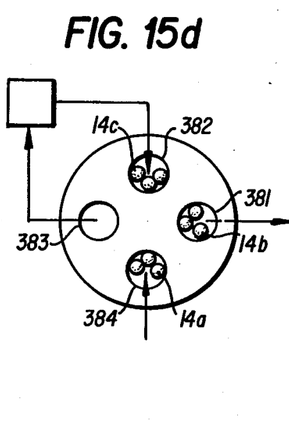

To take out the balls from the system after a certain number of cleaning modes, the valve 31 is opened when the movable member is in the phase illustrated in FIG. 15c or FIG. 15d. Upon opening of valve 31, the concentrated water flows into the upstream segment (22a) of the ball takeout line (22) and the balls are ejected from the system by the force of the concentrated water.

While, in the above embodiment, the ball feed and takeout lines (21, 22) are formed as branches of the feedwater line and concentrated-water line, respectively, an independent source of hydraulic medium may be provided for the feeding and withdrawal of balls when pressure fluctuations within the tubular membrane separation apparatus are objectionable.

The tubular membrane separation apparatus incorporating the cleaning ball delivery means according to this invention is simple in structure, permits an easy feeding and circulation of cleaning balls even during a continued operation of the apparatus and can be built at reduced cost. The apparatus also lends itself to an automatic operation and the operation control is facilitated because the cleaning of the tubular membrane can be effected by a mere shifting of a movable member. Moreover, because the shifting of the movable member does not interfere with the running of the separation apparatus in any manner, cleanings at short intervals is now made possible so that the inner surface of the membrane can be maintained in a clean condition throughout the continued operation. Thus, without any significant reduction in the separation performance of the tubular membrane, the separation apparatus can be operated with efficiency over an extended period of time.

The tubular membrane separation apparatus according to the present invention is therefore effective for use in purification of turbid water, concentration of liquid material such as juice, sea water desalting and so on.

Obviously, many modifications and variations of the present invention are possible in light of the above teachings. It is therefore to be understood that within the scope of the appended claims the invention may be practiced otherwise than as specifically described herein.

What is claimed as new and intended to be secured by Letters Patent of the United States is:

1. A tubular membrane separation apparatus which comprises:
   a feedwater line;
   tubular membrane means adapted to concentrate a feedwater communicating with said feedwater line;
   a concentrated-water line which is disposed in such a manner that the direction of flow therein is opposite to the direction of flow in said feedwater line and which is communicated with said tubular membrane means downstream thereof; and
   cleaning ball delivery means,
   said cleaning ball delivery means including:
   a stationary member disposed to cross said feedwater line and concentrated-water line and divide each of the two lines into an upstream and downstream segment;
   said stationary member being provided with passageways extending in parallel with each other and respectively adapted to communicate said upstream segment of feedwater line with said downstream segment thereof and said upstream segment of concentrated-water line with said downstream segment thereof;

a movable member which comprises at least one ball retaining member including a chamber formed in communicable relationship with an upstream and a downstream segment of each of said passageways and a screen disposed adjacent one end of said chamber, said movable member being movably mounted within said stationary member in such a manner that said ball retaining member may be alternately shifted into phase with said two passageways; and seal means adapted and disposed to establish a fluid-tight seal between cooperating surfaces of said stationary member and said movable member.

2. A tubular member separation apparatus as defined in claim 1 wherein said stationary member of said cleaning ball delivery means is further provided, in parallel with said feedwater line and concentrated-water line, with a third passageway having the same direction of flow as the concentrated water line and communicating an upstream segment of a cleaning ball feed line with a downstream segment thereof and/or a fourth passageway having the same direction of flow as the feedwater line and communicating an upstream segment of a cleaning ball takeout line with a downstream segment thereof, said movable member being movably mounted within said stationary member in such a manner that said ball retaining member may be shifted in an indexing movement from a position in phase with one of said passageways to a position in phase with the other passageway.

3. A tubular membrane separation apparatus as defined in claim 1 wherein said parallel passageways in said stationary member of said cleaning ball delivery means are disposed in a common plane and said movable member is slidably mounted within said stationary member in such a manner that said ball retaining member may be shifted in an indexing movement in said common plane.

4. A tubular membrane separation apparatus as defined in claim 1 wherein said movable member is rotatably mounted on said stationary member of said cleaning ball delivery means and said passageways in said stationary member with said ball retaining member in said movable member being disposed in concentric relation about the axis of rotation of said movable member.

5. A tubular membrane separation apparatus as defined in claim 1 wherein each of said passageways within said stationary member of said cleaning ball delivery means is provided with a bypass-line.

* * * * *